(12) United States Patent
Posselt

(10) Patent No.: US 7,077,957 B2
(45) Date of Patent: Jul. 18, 2006

(54) OVERFLOW SCREENING DEVICE

(75) Inventor: Stephen John Posselt, Karalee (AU)

(73) Assignee: Son Screen Pty Ltd, Karalee (AU)

( * ) Notice: Subject to any disclaimer, the term of this patent is extended or adjusted under 35 U.S.C. 154(b) by 0 days.

(21) Appl. No.: 10/390,746

(22) Filed: Mar. 19, 2003

(65) Prior Publication Data

US 2003/0178359 A1 Sep. 25, 2003

(30) Foreign Application Priority Data

Mar. 25, 2002 (AU) ..................... PS1355

(51) Int. Cl.
*B01D 35/22* (2006.01)
*B01D 29/25* (2006.01)
*B01D 29/64* (2006.01)
*B01D 29/90* (2006.01)

(52) U.S. Cl. .................. 210/304; 210/306; 210/355; 210/408; 210/409; 210/415

(58) Field of Classification Search ............... 210/304, 210/306, 415, 355, 408, 409
See application file for complete search history.

(56) References Cited

U.S. PATENT DOCUMENTS

| 431,448 | A | * | 7/1890 | Dixon | ................ 210/355 |
|---|---|---|---|---|---|
| 722,906 | A | * | 3/1903 | Rood | ................ 210/355 |
| 776,801 | A | * | 12/1904 | Rood | ................ 210/355 |
| 811,664 | A | * | 2/1906 | Rood | ................ 210/355 |
| 1,800,757 | A | * | 4/1931 | Schlosser | ................ 210/248 |
| 2,606,663 | A | * | 8/1952 | Blackman et al. | ................ 210/303 |
| 2,652,153 | A | * | 9/1953 | Perrault | ................ 210/355 |
| 2,661,664 | A | * | 12/1953 | Baxter, Jr. | ................ 241/73 |
| 3,379,312 | A | * | 4/1968 | Brown | ................ 210/415 |
| 3,959,140 | A | * | 5/1976 | Legras | ................ 210/107 |
| 4,451,366 | A | | 5/1984 | Smisson | |
| 5,698,099 | A | * | 12/1997 | Fagan et al. | ................ 210/304 |
| 6,155,430 | A | * | 12/2000 | Goodman | ................ 210/355 |

FOREIGN PATENT DOCUMENTS

| EP | 0 363 050 A1 | | 4/1990 |
|---|---|---|---|
| FR | 2621830 | * | 4/1989 |
| GB | 2 293 993 A | | 1/1996 |
| JP | 58-000211 | * | 1/1983 |
| SU | 1178492 | | 9/1985 |
| WO | 82/01666 | * | 5/1982 |

* cited by examiner

*Primary Examiner*—Thomas M. Lithgow
(74) *Attorney, Agent, or Firm*—Hoffman, Wasson & Gitler, PC

(57) ABSTRACT

A screening device which is particularly useful for separating solids from liquids when sewerage systems overflow. The device includes an inner apertured chamber and an internal brush arrangement for sweeping over the apertures to prevent clogging. A spray enables the apertured chamber to be washed after use.

11 Claims, 1 Drawing Sheet

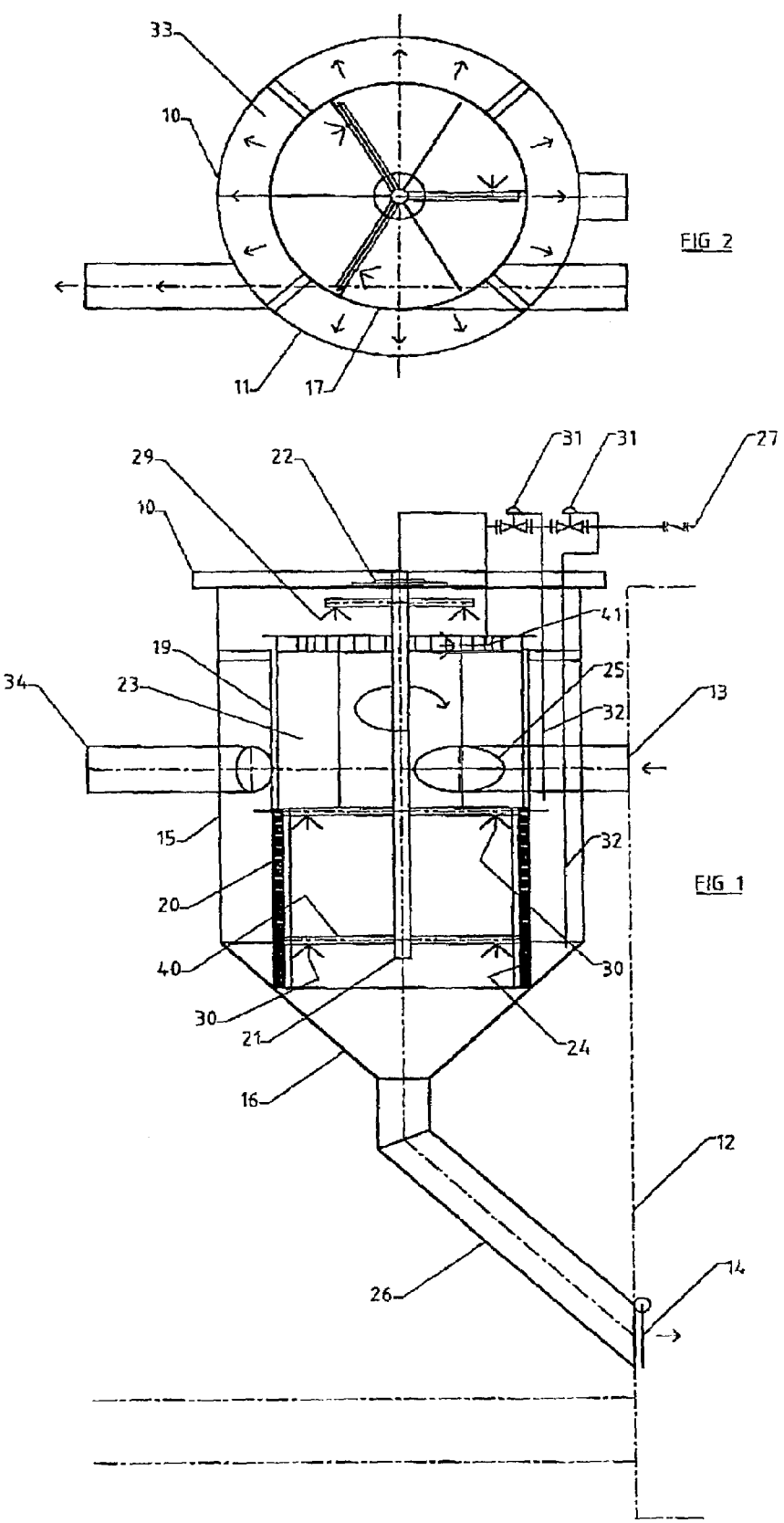

OVERFLOW SCREENING DEVICE

BACKGROUND OF THE INVENTION

This invention relates to separation devices and is particularly concerned with an overflow screening device for the separation of liquid-borne solids from a carrier liquid.

There are many situations where solids/liquid mixtures in a holding or reaction tank, or a liquid conveyancing system, can overflow due to power outages, excess input flow rates, plant breakdown, and the like. In those cases it is often desirable to separate the solids from the liquid so that the solids can be returned to the tank and the liquid discharged.

BRIEF DESCRIPTION OF THE PRIOR ART

Recently, hydrocyclones and like devices have been used for these types of separation. One such hydrocyclone is the subject of British Patent application GB 2293993A which includes a vortex-forming chamber with tangential inlet and which is characterized by a concave foraminous screen arranged to interfere with the vortex. Removal of solids on the screen is assisted, for instance, by scraping or washing devices on the exterior of the screen. Such hydrocyclones, however, are not entirely effective for removing diverse ranges of solids which are found, for instance, on sewage, particularly the more fibrous or stringy solids materials.

It is therefore an object of the invention to provide an overflow screening device which overcomes this problem or which at least provides the public with a useful alternative.

BRIEF SUMMARY OF THE INVENTION

According to the present invention there is provided an overflow screening device which includes an internal coaxially aligned cylindrical chamber having a wall section with a plurality of apertures and an internal brush arrangement for sweeping over the apertures.

The construction and arrangement is such that a flow of liquid and solids directly into the internal chamber by way of an inlet tangentially located with respect to the side wall of the internal chamber, results in the separation of the liquid through the apertures into a region between the internal chamber and the wall of the device for discharge through an outlet in the side wall of the device and the containment of the solids for collection at an outlet at the bottom of the device, or retained in the device for later retrieval.

BRIEF DESCRIPTION OF THE DRAWINGS

FIG. 1 is a schematic side cross-sectional view of an overflow screening device according to the present invention fitted to a sewage storage tank (shown in phantom), and FIG. 2 is a partial cross-sectional plan view of the overflow screening device described in FIG. 1.

DETAILED DESCRIPTION OF THE INVENTION

The provision of the apertured inner chamber enables effective separation of a diverse range of solids down to a size governed by the size of the apertures, and the provision of the brush arrangement ensures that the apertures are kept free from being clogged.

The overflow screening device preferably has a cylindrically shaped upper section and conically-shaped lower section which leads to the solids outlet or retention area.

The internal coaxially aligned cylindrical chamber preferably extends downwardly from the top of the overflow screening device to the conically-shaped section. The upper portion of the internal chamber can have a solid wall with the lower portion being apertured. The solids/liquid inlet is suitably located in the upper portion of the wall and directs the incoming solids/liquid around the wall in a swirling action.

The brush arrangement preferably comprises a number of rectangular frameworks with attached bristles on lower outer sections, which are supported for rotation on a vertically extending axle which is aligned with the axis of the device. The axle is freely rotatable on bearings located in the upper wall of the device. Vanes, preferably rectangular in shape, extend outwardly from the upper sections of the rectangular frameworks. The arrangement is such that when the swirling motion of the input stream of solids/liquid comes into contact with the vanes, the vanes rotate and cause the bristles to brush over the inner wall of the apertured chamber. Preferably, the vanes extend over the entire upper portion of the internal chamber and comprise between four and twelve individual components. A particularly preferred number of vanes is six.

The bristles on the brush should preferably be flexible so as not to impede the rotation of the vanes. Suitable bristles are polyethylene strands, similar to that found in soft brushes.

The size of the apertures in the internal chamber will be determined by the size of the solids which it is desired to prevent passage into the overflow stream of liquid. Generally they will be in the order of 2–10 mm, most generally about 3–5 mm in diameter.

A spray system can be provided to wash the vanes and the inner walls of the internal chamber. This can comprise a plurality of nozzles associated with the upper portion of the internal chamber, which are fed through the axle when automatic control valve senses that the liquid level within the chamber has dropped below a pre-set level.

The overflow screening device is particularly suitable for use in association with a sewerage scheme when connected to an existing overflow. In such a situation, the device is suitably designed to separate solids of greater than about 3–5 mm from a discharge liquid; the solids being returned to the sewage storage.

A preferred embodiment of the invention will now be described with reference to the accompanying drawings, in each of which like reference numerals refer to like parts.

Referring to both drawings simultaneously, the overflow screening device 10 is connected to a sewage storage tank 12 at a sewage overflow 13 and through a solids return inlet 14. The screening device includes a stainless steel housing 11 having an upper substantially conical section 16 which leads to the solids return inlet 14.

An internal coaxially aligned stainless steel cylindrical chamber 17 extends downwardly from an upper region of the screening device and meets the conical wall 16. Chamber 17 has an upper wall region 19 which is solid and a lower wall region 20 which is perforated with a plurality of apertures.

An axle 21 is located on the axis of the screening device and is supported by bearings 22 in the upper wall thereof. The axle has rectangular frameworks 40 projecting therefrom with six rectangular vanes 23 fitted thereto so as to rotate in a horizontal plane. The vanes are formed of light weight material. Brushes 24 extend along the lower peripheries of the framework 40 adjacent to the lower wall region 20 of the cylindrical chamber 17.

An inlet 25 to the internal cylindrical chamber 17 extends from the sewage overflow 13 of the sewage storage tank so as to direct the raw sewage mixture of liquid and solids tangentially against the vanes 23 located in the internal cylindrical chamber 17.

The bottom of the screening device has a conduit 26 which directs separated solids to the return inlet 14 of the sewage storage tank 12.

Town water supply line 27 with a backflow prevention device admits water through a hollow section of the axle 21 to outlet nozzles 29, 30. The flow of water is regulated by automatic control valves 31 which sense through a level sensor 32 when the level of liquid in the chamber falls below a pre-set level.

In operation, when sewage overflows through the overflow 13 due to an electrical outage or the like, the tangential flow into the internal chamber 17 of the device causes the vanes to rotate and the liquid to pass through the apertures to the outer region 33 for discharge through an outlet 34 in the wall of the screening device. Heavy solids within the device settle to the bottom and return to the one way inlet 14 of the sewage tank 12. Solids which are buoyant remain in the chamber 17 until the level in the sewage tank drops to such an extent that these solids are also returned to the sewage tank.

As the level of liquid in the overflow screening device drops, the water supply is automatically actuated and the inner walls of the camber are sprayed through nozzles 29, 30. Spray from nozzle 41 is directed against vanes on the rotating mechanism to provide rotation independent of sewage inflow.

In cases where there is insufficient sewage flow to rotate the brushes, the cleaning sprays may be activated during the overflow event to assist with rotation.

In this manner, an effective separation of a solids/liquid feedstuffs is achieved with the liquid stream being discharged and the solids stream being returned to storage for processing.

What is claimed is:

1. An overflow screening device used in association with the overflow of a sewerage system, said screening device comprising an internal coaxially aligned cylindrical chamber having a cylindrical side wall section with a plurality of apertures and an internal brush arrangement for sweeping over the apertures, said screening device further including a solids/liquid inlet tangentially located with respect to the side wall of the internal cylindrical chamber, a solids outlet in the bottom of the device within the boundaries of the internal cylindrical chamber, and wherein the solids are returned by way of the solids outlet to the sewerage system.

2. An overflow screening device as claimed in claim 1, wherein the apertures in the internal cylindrical chamber are dimensioned to enable the effective separation of a diverse range of solids.

3. An overflow screening device as claimed in claim 1, wherein the apertures in the internal cylindrical chamber are in the order of 3 to 5 mm in diameter.

4. An overflow screening device as claimed in claim 1 and including a spray system for washing the interior of the internal cylindrical chamber.

5. An overflow screening device according to claim 1 wherein said cylindrical chamber is substantially vertically disposed within the overflow screening device.

6. An overflow screening device as claimed in claim 5, which has a cylindrically shaped upper section and a conically shaped lower section.

7. An overflow screening device as claimed in claim 6, wherein the internal cylindrical chamber extends down from the top region of the device to the conical lower section.

8. An overflow screening device as claimed in claim 5, wherein an upper region of the internal cylindrical chamber has a solid wall and a lower region has an apertured wall.

9. An overflow screening device as claimed in claim 5, wherein the solids/liquid inlet is located juxtaposed with respect to an upper region of the internal cylindrical chamber.

10. An overflow screening device as claimed in claim 5, wherein the brush arrangement comprises a plurality of rectangular frameworks with attached bristles on lower outer sections, which are supported for rotation on a vertically extending axle which is aligned with the axis of the device.

11. An overflow screening device as claimed in claim 10, wherein rectangularly shaped vanes extend outwardly from upper sections of the rectangular frameworks.

* * * * *